FIG. 3

CHANGE OF MEAN VALUE AND DISPERSION OF THE VOLTAGE DROP BETWEEN THE ANODE AND THE CONDUCTOR WITH THE LAPSE OF TIME.

- •———• MEAN VALUE ⎫ OF THE VOLTAGE DROP IN CASE OF THE
- •-------• DISPERSION ⎭ PRESENT ELECTRIC CONDUCTOR.
- ×———× MEAN VALUE ⎫ OF THE VOLTAGE DROP IN CASE OF CON-
- ×-------× DISPERSION ⎭ VENTIONAL ELECTRIC CONDUCTOR.

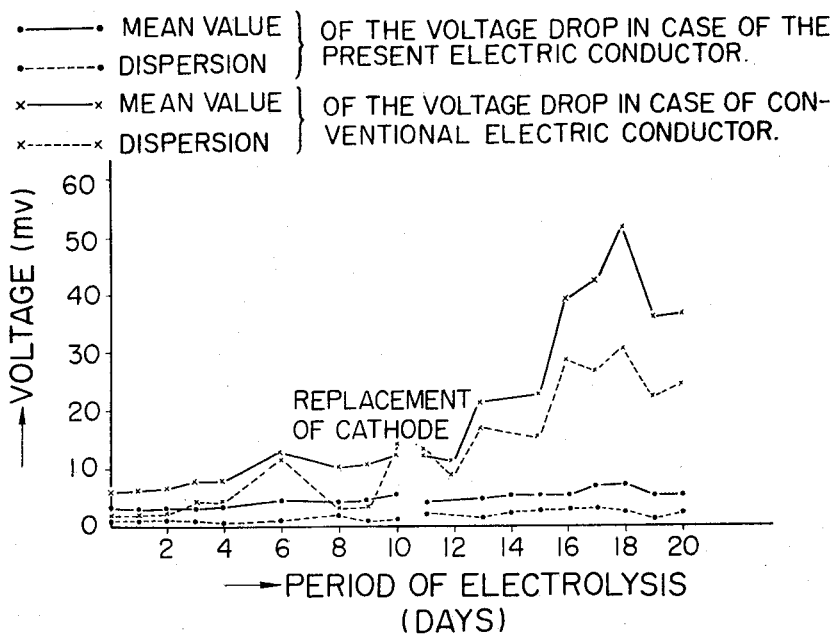

FIG. 4

CHANGE OF MEAN VALUE AND DISPERSION OF THE VOLTAGE DROP BETWEEN THE CATHODE AND THE CONDUCTOR WITH THE LAPSE OF TIME.

- •———• MEAN VALUE ⎫ OF THE VOLTAGE DROP IN CASE OF THE
- •-------• DISPERSION ⎭ PRESENT ELECTRIC CONDUCTOR.
- ×———× MEAN VALUE ⎫ OF THE VOLTAGE DROP IN CASE OF CON-
- ×-------× DISPERSION ⎭ VENTIONAL ELECTRIC CONDUCTOR.

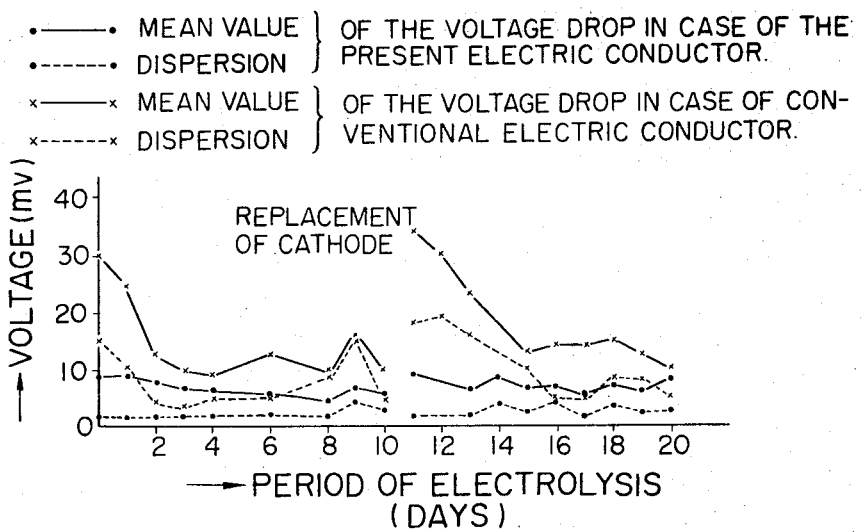

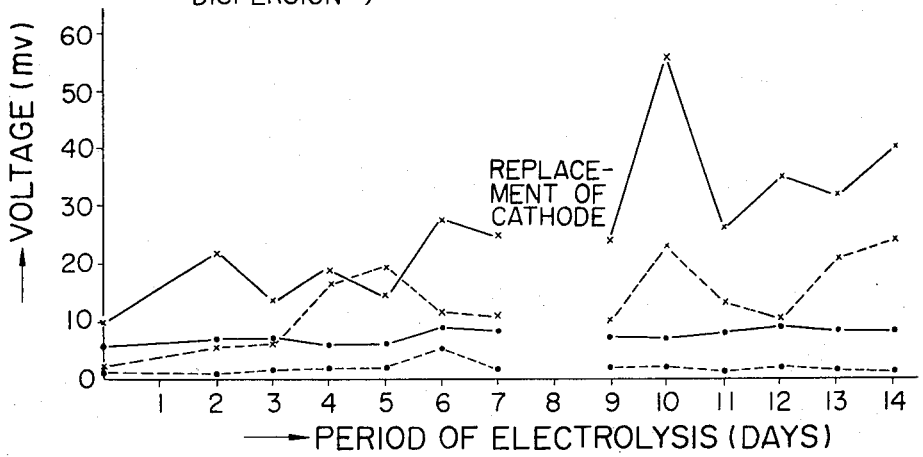
FIG. 5  CHANGE OF MEAN VALUE AND DISPERSION OF THE VOLTAGE DROP BETWEEN THE ANODE AND THE CONDUCTOR WITH THE LAPSE OF TIME.
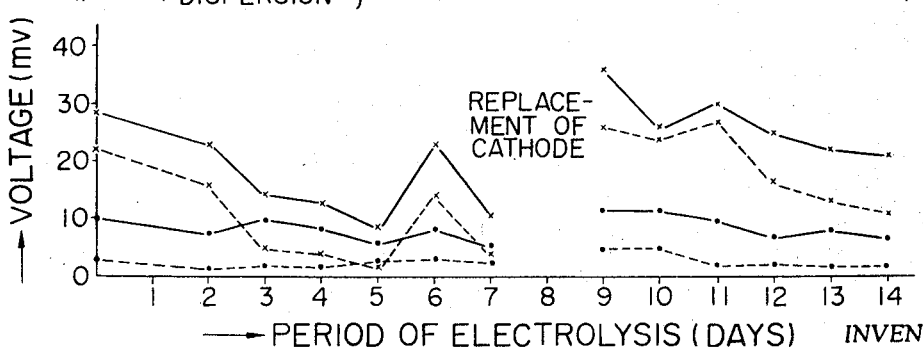
FIG. 6  CHANGE OF MEAN VALUE AND DISPERSION OF THE VOLTAGE DROP BETWEEN THE CATHODE AND THE CONDUCTOR WITH THE LAPSE OF TIME.

United States Patent Office 3,741,885
Patented June 26, 1973

3,741,885
ELECTRIC CONDUCTOR FOR USE IN METALLIC
SALT ELECTROLYTIC CELL
Kenji Sasaki, Takehara, Japan, assignor to Mitsui Mining
& Smelting Co., Ltd., Chuo-ku, Tokyo, Japan
Filed May 4, 1971, Ser. No. 140,147
Claims priority, application Japan, May 7, 1970,
45/38,232
Int. Cl. C23b 5/68
U.S. Cl. 204—288   2 Claims

ABSTRACT OF THE DISCLOSURE

An electric conductor to serve for a metallic salt electrolytic cell which is characterized by the provision of: the liquid-containing portion prepared by engraving a groove or hollow on the surface of the conductor; a liquid-impregnatable spongy substance inserted in said liquid-containing portion in such a fashion as bringing said spongy substance into contact with the electrode or electrode beam to be mounted on the liquid-containing portion on the occasion of electrolysis operation; and a conductive liquid put in the liquid-containing portion to see that the portion of the spongy substance in contact with the electrode or electrode beam be maintained in wet condition during electrolysis by virtue of the conductive liquid impregnated in the spongy substance.

BACKGROUND OF THE INVENTION

(1) Field of the invention

The present invention relates to an improved electric conductor for use in charging electricity on the electrodes of the metallic salt electrolytic cell.

(2) Description of the prior art

In the electrolysis of aqueous solution of metallic salt in general, the contact resistance of conductors installed on the side wall of an electrolytic cell with anodes or cathodes in contact with said conductor is considered as a factor having a great influence on the performance of the electrolysis operation.

In other words, the amount of voltage drop due to the contact resistance accounts for a considerable part of the voltage imposed on the electrolytic cell so that it brings about the loss of power intended for effecting electrolysis, and the voltage drop, coupled with the unevenness of the contact resistance at each contact and the fluctuations of this contact resistance in the course of electrolysis which cause drifts among the electrodes, results in products of defective quality.

Such being the case, there have hitherto been proposed various modifications in shape, etc. of the conductor as well as the contact area of electrodes with a view to improving the mode of contact, but the results have fallen short of expectations.

In the meantime, with a marked tendency to raise the current density and employ a large-sized electrolytic cell as is seen lately, the amount of electric current to be applied to the electrolytic cell increases and, accordingly, the loss of power and increase of drift due to said contact resistance is becoming more and more a problem.

Even when such cleaning treatment as cleansing with acid, abrasion or the like is applied to said contact area prior to starting electrolysis, because of a metal oxide film developing on the contact area in course of electrolysis, the electric conductor and the anodes or cathodes are brought into contact with each other through the oxide film interposed therebetween. Inasmuch as a metal oxide is generally possessed of a higher electric resistance than the metal, the voltage drop due to the oxide film layer seems to play a dominant part in the foregoing defective performance of electrolysis operation.

SUMMARY OF THE INVENTION

The inventors have found that, by virtue of maintaining said contact area in wet condition by means of a conductive liquid, it is possible to lessen the contact resistance as well as unevenness thereof even in case of electrolysis for hours.

The present invention relates to an electric conductor developed on the basis of this finding.

The object of the present invention is to provide an electric conductor for use in a metallic salt electrolytic cell in which the surface of the conductor is provided with the liquid-containing portion prepared by engraving a groove or hollow thereon; a liquid-impregnatable spongy substance is inserted in the liquid-containing portion in such a fashion as to bring said spongy substance into contact with an electrode or electrode beam to be mounted on the liquid-containing portion on the occasion of electrolysis operation; and a conductive liquid is put in the liquid-containing portion to see that the portion of the spongy substance in contact with the electrode or electrode beam be maintained in wet condition due to the conductive liquid.

The present invention features that not only the contact resistance is lessened but also the unevenness thereof is minimized by means of providing a liquid-containing portion on the conductor so as to maintain its portion in contact with the electrode in wet condition.

Given in the following are typical examples embodying the present invention in electrolytic refining of copper by applying a conductor as shown in FIG. 1. In this figure, the numeral reference 1 is the conductor provided with liquid-containing portion 2 in which a liquid-impregnatable spongy substance 3 such as a sponge, sponge rubber or foamed plastics is placed, and an electrode (or electrode beam, crossbar or shoulder) 4 is disposed as shown in the drawing. As illustrated in FIGS. 1 and 2, the conductor 1 has a longitudinally extending groove defining the portion 2. The sponge 3 fills the groove and projects above the upper surface of the conductor 1. The electrode supports 4 are supported on the upper surface portions of the conductor 1 on opposite sides of the groove. The supports 4 extend into contact with the upper surface of the sponge and compress same. A conductive liquid contained in the liquid-containing portion 2 is replenished by such an amount as counterbalancing the amount evaporating either by continuous dripping or intermittent pouring so that the portion of the spongy substance in contact with the electrode be maintained in wet condition all the time. The cross section of the conductor is as shown in FIG. 2. The examples of the conductive liquid are, for example, water; dilute acid such as sulfuric acid; aqueous alkali such as sodium hydroxide; and aqueous metallic salt such as copper sulfate.

BRIEF DESCRIPTION OF THE DRAWINGS

Referring to the appended drawings, FIG. 3 shows the change of the interelectrode mean value as well as the dispersion of voltage drop between the conductor and the respective anode with the lapse of time as described in Example 1. FIG. 4 shows the change of the voltage drop between the conductor and the respective cathode with the lapse of time as also described in Example 1. FIG. 5 and FIG. 6 show the change of the voltage drop between the conductor and the anode and cathode respectively with the lapse of time as described in Example 2.

PREFERRED EMBODIMENTS OF THE INVENTION

Example 1

Figure 1:
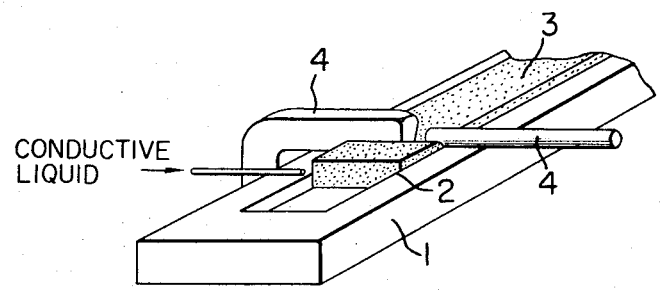
FIG. 1 is a schematic representation of how to fix electrodes onto an electric conductor according to the present invention.
Figure 2:
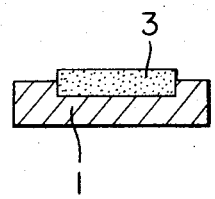
FIG. 2 is a sectional view of the electric conductor.

Prior to starting electrolysis operation, the portion of the anode and cathode in contact with the electric conductor as shown in FIG. 1, in which a spongy substance is a sponge and a conductive liquid is water, was made to be free of the oxide film by means of cleansing with sulfuric acid, abrasion and the like.

Electrolysis condition

Cathode current density _____ 220 A./m.$^2$.
Anode spacing (center to center) ___ 100 m./m.
Temperature of electrolyte _____ 60° C.
Composition of electrolyte _____ Cu 45 g./l.
    $H_2SO_4$ 190 g./l.
Number of anodes per cell _____ 35.
Number of cathodes per cell _____ 34.

When electrolysis was conducted under the foregoing condition, the comparative mean values and dispersion with respect to the voltage drop due to said contact resistance, cell voltage and cathode current in case of application of the conductor according to the present invention and that in the prior art were as shown in the following Table 1.

TABLE 1

|  | Voltage drop between the anode and the conductor (mv.) | | Voltage drop between the cathode and the conductor (mv.) | | Cell voltage (mv.) | Cathode current (a.) | |
|---|---|---|---|---|---|---|---|
|  | Mean value [1] | Dispersion [2] | Mean value [1] | Dispersion [2] | Mean value [1] | Mean value [1] | Dispersion [2] |
| Present conductor | 4.5 | 1.50 | 7.0 | 2.6 | 229 | 333 | 26.7 |
| Conventional conductor | 20.3 | 13.4 | 15.4 | 9.3 | 257 | 333 | 31.3 |

[1] Mean value: represents the value figured out by measuring the value of voltage of the respective electrodes once a day, computing the mean value of the voltages thus measured, and averaging the mean values thus computed over the whole period of electrolysis.
[2] Dispersion: represents the value figured out by measuring the value with respect to each electrode once a day, computing the standard deviation on the basis of values thus measured, and averaging the thus computed deviations over the whole period of electrolysis.

In this connection, FIG. 3 and FIG. 4 show the change of voltage drop at the anode and the cathode, respectively, in course of time.

Example 2

By applying the same apparatus as in Example 1 while raising the current density, electrolysis was conducted under the following condition.

Electrolysis condition

Cathode current density _____ 300 A./m.$^2$.
Anode spacing (center to center) ___ 100 m./m.
Temperature of electrolyte _____ 60° C.
Composition of electrolyte _____ Cu 45 g./l.
    $H_2SO_4$ 190 g./l.
Number of anodes per cell _____ 26.
Number of cathodes per cell _____ 25.

The comparative mean values and dispersion with respect to the voltage drop due to said contact resistance, cell voltage and cathode current in case of application of the conductor according to the present invention and that in the prior art at the time of the foregoing electrolysis were as shown in the following Table 2.

In this connection, shown in FIG. 5 and FIG. 6 respectively is the change of mean values and dispersion in course of time with respect to the anode and the cathode.

Example 3

In Example 1, electrolysis was repeated using, as a conductive liquid, dilute sulfuric acid in place of water. The result was as almost same as in Example 1.

As is clear from the above examples, the electric conductor according to the present invention can reduce the voltage drop between conductor and electrode to about one third of that in case of the conventional electric conductors and the unevenness of the said voltage drop in case of the former is remarkably minimized compared with that in case of the latter.

Especially, with the increase in amperage, the present electric conductor can display a more enhanced efficiency and hold back the rise in the electric power consumption.

What we claim is:

1. In a metal salt electrolytic cell, in which multiple anodes and multiple cathodes are disposed in the cell in vertical parallel relationship and have sidewardly extending conductive portions supported on conductor bars on the side walls of the electrolytic cell, the improvement which comprises, said conductor bar is an elongated member having a central longitudinally extending groove in its upper surface and having substantially flat electrode-support upper surface portions on opposite sides of said groove and offset vertically upwardly from the bottom wall of said groove, a liquid-impregnatable sponge substantially filling said groove and projecting upwardly therefrom above said electrode-support upper surface portions, said sponge being adapted to contain a conductive liquid, said sidewardly extending conductive portions of said multiple anodes and cathodes comprising straight horizontal sections extending over the upper surface of said conductor bar into contact with the upper surface of said sponge, said sections of said sidewardly extending conductive portions being supported on said electrode-support upper surface portions and compressing the portions of the sponge in contact therewith.

TABLE 2

|  | Voltage drop between the anode and the conductor (mv.) | | Voltage drop between the cathode and the conductor (mv.) | | Cell voltage (mv.) | Cathode current (a.) | |
|---|---|---|---|---|---|---|---|
|  | Mean value | Dispersion | Mean value | Dispersion | Mean value | Mean value | Dispersion |
| Present conductor | 7.4 | 1.9 | 8.4 | 2.6 | 296 | 432 | 15.4 |
| Conventional conductor | 26.6 | 13.4 | 21.6 | 14.5 | 328 | 419 | 41.3 |

2. An electrolytic cell as defined in claim 1, wherein said spongy substance is selected from the group consisting of sponge, sponge rubber and foamed plastics.

References Cited

UNITED STATES PATENTS

| | | | |
|---|---|---|---|
| 2,890,991 | 6/1959 | MacLean | 204—297 R |
| 646,150 | 3/1900 | Langton | 204—286 |
| 3,579,431 | 5/1971 | Jasberg | 204—280 |
| 2,847,375 | 8/1958 | Murphy | 204—197 |

F. C. EDMUNDSON, Primary Examiner

U.S. Cl. X. R.

204—286